(12) United States Patent
Parry et al.

(10) Patent No.: US 9,508,046 B2
(45) Date of Patent: Nov. 29, 2016

(54) METHODS AND SYSTEMS FOR PROVIDING WEB CONTENT TO A PRINTING DEVICE

(75) Inventors: Travis J. Parry, Boise, ID (US); Brett Green, Meridian, ID (US); Gregory E. Perkins, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2769 days.

(21) Appl. No.: 10/625,241

(22) Filed: Jul. 22, 2003

(65) Prior Publication Data

US 2005/0018233 A1 Jan. 27, 2005

(51) Int. Cl.
*G06F 15/00* (2006.01)
*G06Q 10/00* (2012.01)

(52) U.S. Cl.
CPC .................................... *G06Q 10/00* (2013.01)

(58) Field of Classification Search
USPC ......................................................... 358/1.15
See application file for complete search history.

(56) References Cited

U.S. PATENT DOCUMENTS

| 6,113,208 | A  | * | 9/2000  | Benjamin et al. ................. 347/7   |
| 6,223,190 | B1 | * | 4/2001  | Aihara et al. .................. 715/234  |
| 6,332,062 | B1 | * | 12/2001 | Phillips et al. .................. 399/12 |
| 6,490,049 | B1 |   | 12/2002 | Cunnagin et al.                          |
| 6,507,763 | B1 | * | 1/2003  | Schneider et al. .............. 700/84   |
| 6,532,351 | B2 | * | 3/2003  | Richards et al. ............. 399/111    |
| 6,585,359 | B1 |   | 7/2003  | Gasvoda et al.                           |
| 2002/0140966 | A1 | * | 10/2002 | Meade et al. ................. 358/1.15 |
| 2003/0033451 | A1 | * | 2/2003  | Yoshida et al. .................... 710/8 |
| 2003/0074268 | A1 | * | 4/2003  | Haines et al. .................. 705/26  |
| 2003/0234957 | A1 | * | 12/2003 | Ohara .......................... 358/1.15 |
| 2004/0051752 | A1 | * | 3/2004  | Asauchi et al. ................. 347/19  |
| 2005/0240518 | A1 | * | 10/2005 | Ishizuka ......................... 705/39 |

\* cited by examiner

*Primary Examiner* — Mark Milia
(74) *Attorney, Agent, or Firm* — Fabian VanCott

(57) ABSTRACT

A method of providing web content for a printing device includes attaching a memory module storing the web content to a printing device consumable.

10 Claims, 4 Drawing Sheets

METHODS AND SYSTEMS FOR PROVIDING WEB CONTENT TO A PRINTING DEVICE

BACKGROUND

With a personal computer and an appropriate software package, a user can produce virtually any type of document that may be desired. For example, word processing software is used to produce text documents. Graphic design or computer-aided design software can be used to produce diagrams, charts, graphs, designs, etc. Frequently, it is desirable to generate a hardcopy of a document or data set that is produced or stored on a personal computer. Consequently, a wide variety of printers and printing devices have been developed that can receive a print job from a host computer and produce a hardcopy of the document or data represented by that print job.

As used herein and in the appended claims, the terms "printer" and "printing device" are defined to mean any device that produces a hardcopy from electronic data, including, but not limited to, laser printers, inkjet printers, dot matrix printers, plotters, facsimile machines, digital copiers, photocopiers, multi-function peripherals, and the like. A printer or printing device may produce images on a variety of print media that are in color or are monochromatic.

In order to produce hardcopy documents, a printer or printing device uses supplies of materials that are "consumed" as documents are printed. Such consumables include, for example, toner and print media. As used herein and in the appended claims, "toner" shall be broadly defined to include any material that is selectively distributed by a printer or printing device on a print medium to form an image. Thus, "toner" includes, but is not limited to, ink, toner, colorant, printing fluid, etc. "Print media" or a "print medium" shall be broadly defined as any medium on which a printer or printing device prints an image. For example, types of "print media" include, but are not limited to, paper, cardboard, card stock, transparencies, vinyl, etc.

As used herein and the appended claims, the term "consumable" shall be defined to mean any material consumed by a printing device to produce hardcopy documents. For example, a consumable may be toner and the disposable cartridge or container that contains the toner in the printing device. A consumable may also be a stack or supply of print media. In addition to toner and print media, a "consumable" may be any part or portion of a printer or printing device that is periodically replaced to allow the printer or printing device to continue producing printed hardcopy documents.

Some printers and printing devices allow a user or operator to obtain and view information about the printing device with a web browser. The web browser, using a connection to the Internet, accesses and displays a web page provided by a web server that is incorporated into the printing device. The printing device is also connected to the Internet. The web page or pages typically contain information about the printing device and may be stored in printing device memory for use by the printing device's web server.

SUMMARY

A method and system of providing web content to a printing device includes attaching a memory module storing the web content to a printing device consumable.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

Figure 1:
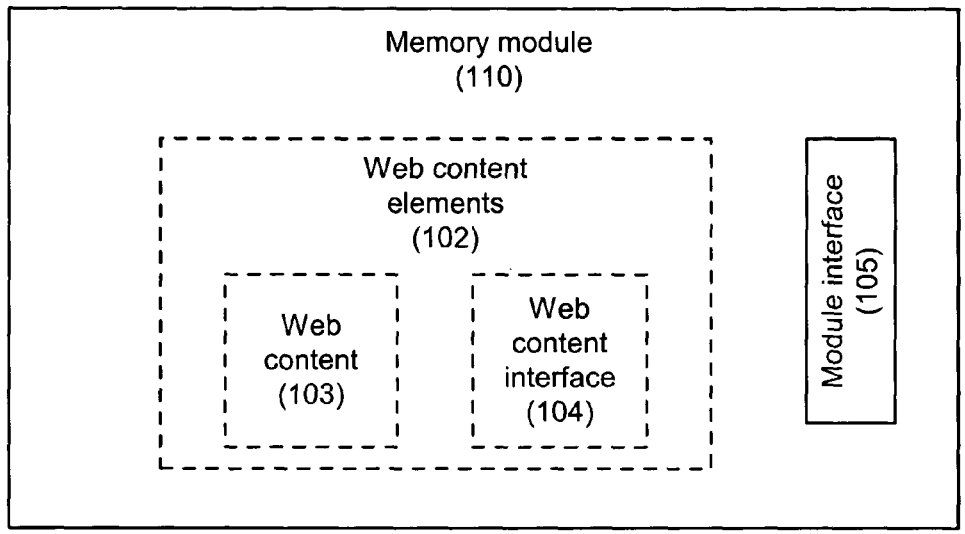
FIG. 1 is a block diagram illustrating web content elements stored on a memory module according to one embodiment of the present invention.

This specification describes a method and apparatus for uploading web content to a printer or printing device from a printing device consumable. This web content can then be used by a web server incorporated into the printer or printing device to serve up a web page that may be accessed and displayed with a web browser over the Internet or World Wide Web ("web"). The web page will provide information about the printing device. The described method includes storing web content on a memory module attached to a printing device consumable and uploading the web content or a web content interface to the printing device for storage in printing device memory when the consumable is loaded into the printing device.

Many printing devices are equipped with a means of providing information about the device, for example, the current operating status of the printing device. Sometimes this information is provided through a printer driver on a host computer that is connected to the printing device and submitting a print job to the printing device. Often such information is also displayed on a display incorporated into the printing device itself. However, as networks become larger and required full-time administrators, it becomes useful if information about a particular printing device can be obtained remotely and regardless of whether one is submitting a print job to that printing device.

Consequently, some printing devices now include an incorporated or "embedded" web server. If the printing device is connected to the Internet, this web server can serve up a web page with information about the printing device. This web page may be accessed and displayed from any computer with a web browser and an Internet connection. However, authorization, such as a password, may be required to access the printing device's web page.

This web page from the embedded web server can provide a host of useful information about the printing device, for example, current device status, physical location, Internet address, configuration settings, supplies status, need to resupply a consumable, event log, usage information, networking information, etc. All this and any other printing device information may be stored in a file, for example, an HTML file, on the printing device and served up as a web page by the printing device's embedded web server. This printing device web page can then be accessed by the user, owner, operator, etc., of the printing device with a web browser.

Printing device settings and printing device information may also be changed remotely through the web page of the printing device. The web page may accept input information into entry fields on the web page that specify changes to printing device settings. Such changes may then be implemented after a user executes a command to save or apply the changes. Again, a password or other authorization may be required before the printing device will accept any such settings changes. The new settings for the printing device may then be viewed by refreshing or reloading the web page from the printing device.

As shown in FIG. 1, web content elements (102) are stored on a memory module (110). The module (110) is a non-volatile memory device, for example, Flash memory, and includes a module interface (105) through which the data stored on the module (110), including the web content elements (102), can be accessed. The module interface (105) can be a wired or wireless interface. As will be described below, the module interface (105) interfaces the memory module (110) with a printing device so that the printing device can upload the web content (103), web content interface (104), and other data items on the memory module (110).

In general, the web content (103) may include any information or programming used as, or as part of, a web page. Web content (103) may include data in the form of text, graphics, videos, pictures, sounds, animations, executable files, etc. Web content (103) may be a complete web page or data added to previously existing web pages. Alternatively, web content (103) may be a separate, additional web page that is added to or linked to one or more other web pages. Web content may also include buttons, links, tabs, frames, entry fields, etc. Any form of web content (103) may be stored on the memory module (110).

In some embodiments, the web content (103) may include information specific to a printing device consumable, e.g., the printing device consumable to which the memory module (110) is affixed. This printing device consumable information may include, for example, the serial number, number of pages printed, number of times a consumable has been refilled, brand name, model number, as well as warranty information such as the maximum copy volume, stated yield, "born-on date", etc.

The web content interface (104) can be uploaded by a printer or printing device and used to access the web content (103) that remains on the memory module (110). The web content interface (104) is stored as computer-readable instructions that can be uploaded and executed by a host printer or printing device. The web content interface (104) may be written according to customer specifications. The web content interface (104) may be programmed in a variety of computer languages, e.g., Java, C++, COM, etc.

Figure 2:
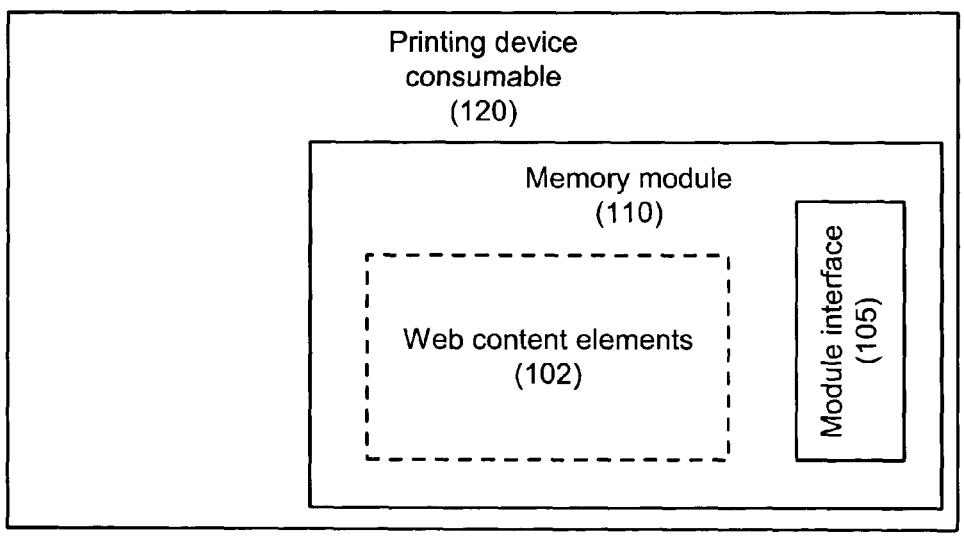
FIG. 2 is a block diagram illustrating a printing device consumable with an affixed memory module according to one embodiment of the present invention.

As shown in FIG. 2, the memory module (110) is attached to a printing device consumable (120) that will be provided to, or placed in, a printer or printing device. As indicated above, a "consumable" is any material, including toner or print media, consumed by a printing device to produce hardcopy documents. In addition to toner and print media, a "consumable" may be any part or portion of a printer or printing device that is periodically replaced to allow the printer or printing device to continue producing printed hardcopy documents. The memory module (110) may, for example, be attached to the disposable cartridge or container that holds the toner in the printing device. The memory module (110) may also be attached to the stack or supply of print media or to some other consumable part of the printing device.

The module interface (105) then provides communication between the printing device and the memory module (110) so that the printing device can upload or use the web content (103), the web content interface (104), and any other data items on the memory module (110). The printing device may upload the web content (103) and other data items on the memory module (110) to a memory unit in the printing device or, alternatively, the printing device may load and execute the web content interface (104) and use the other data items, e.g., web content (103), directly from the memory module (110).

As indicated, the module interface (105) may be a wired or wireless interface for transferring data between the memory module (110) and a printing device. For example, the module interface (105) may comprise input/output lines or pins for allowing wired transmission and reception of data between the memory module (110) and a host printing device. Alternatively, the module interface (105) may also include an infrared transceiver to send and receive data wirelessly with an infrared signal. In still another example, the module interface (105) may include an antenna coil to send and receive data wirelessly using, for example, a radio frequency (RF) signal. For example, a Radio Frequency Identification (RFID) method and protocol may be used to transmit data between a memory module (110) and a printing device. Using a wireless method, as described herein, is advantageous because no physical contact between the memory module (110) and printing device is required.

Figure 3:
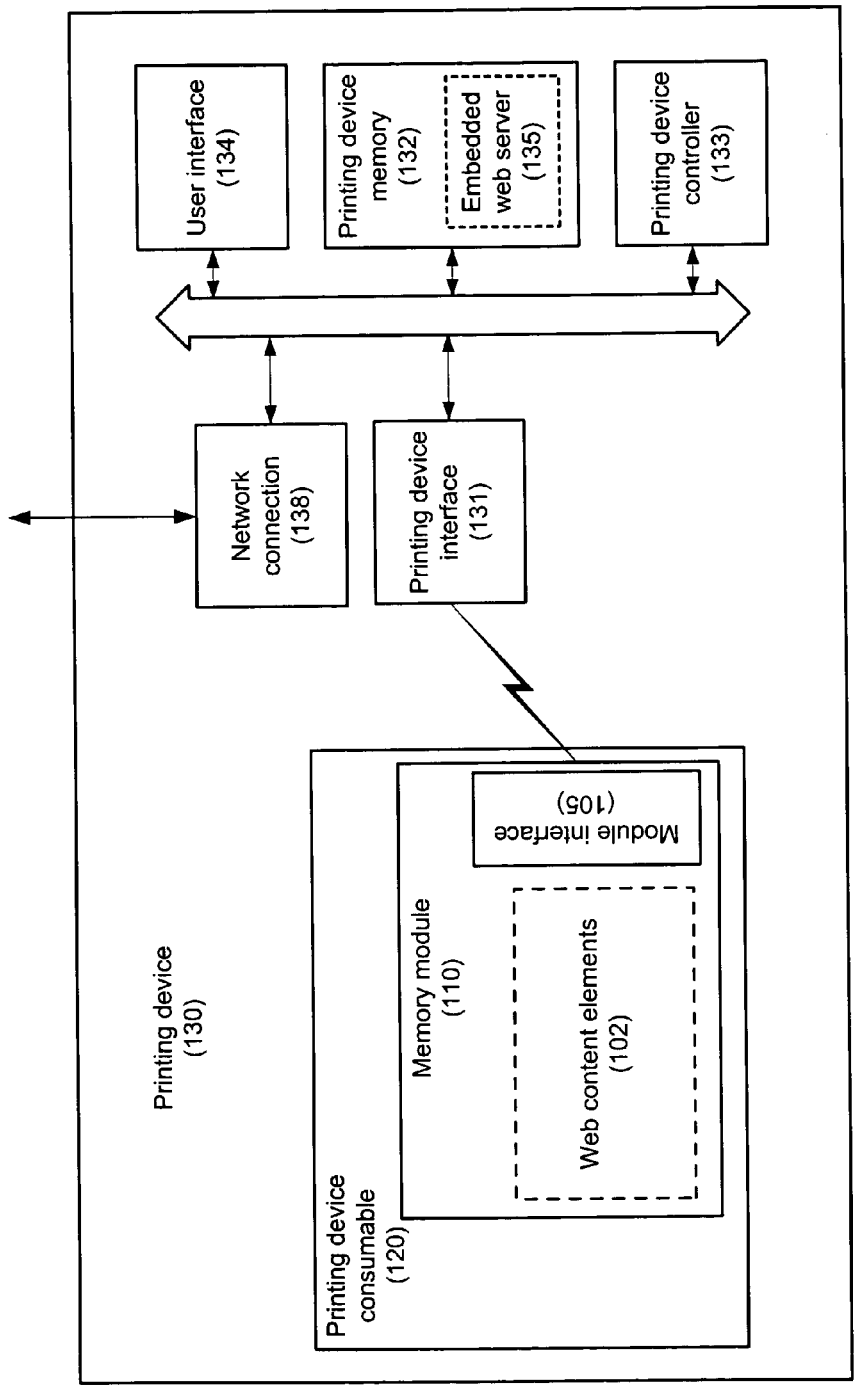
FIG. 3 is a block diagram of the consumable and memory module of FIG. 2 in use by a printing device according to one embodiment of the present invention.

FIG. 3 is a block diagram illustrating a consumable (120) that has been installed in, or supplied to, a printer or printing device (130). The consumable (120) bears a memory module (110) storing web content elements (102) for use by the printing device (130) as described above.

As shown in FIG. 3, the printing device (130) includes a printing device interface (131) that interfaces with the module interface (105) on the memory module (110). The printing device interface (131) will correspond to the module interface (105) to allow communication between the memory module (110) and the printing device (130). Consequently, the printing device interface (131) may be a receptacle for receiving the pins or wired traces of a wired module interface (105). Alternatively, the printing device interface (131) may be a wireless transceiver for communicating with a wireless transceiver of the module interface (105). In one embodiment, the memory module (110) may comprise an RFID memory tag as part of the module interface (105), and the printing device interface (131) may comprise an RFID interrogator. Alternatively, the module interface (105) and printing device interface (131) may be, for example, an infrared interface. The printing device interface (131) and the module interface (105) will be referred to collectively as the interface (105, 131).

Upon installation of the consumable (120), the web content (103) can be used in conjunction with an operable embedded web server (e.g., 135) to provide a web page from the printing device (130) to a requesting web browser though a network to which the printing device (130) is connected (138). The network may be a local area network (LAN), a wide area network (WAN) and/or the Internet or Web. As used herein and in the claims, the phrase "embedded web server" refers to a set of computer-readable instructions (e.g., software or firmware) for providing a printer or printing device with the function or capability of sending and/or receiving data via a web page over the Internet, Web or other network.

The printing device (130) can upload the web content elements (102) and any other data items on the memory module (110) through the interface (105, 131). The web content elements (102) and any other uploaded data items may be stored in the memory unit (132) of the printing device (130). This printing device memory (132) may comprise both volatile and non-volatile memory, both writable and read-only memory. If the web content elements (102) are uploaded to the memory unit (132), those web content elements (102) may be stored in non-volatile memory so as to be available each time the printing device (130) is powered up.

Alternatively, the interface (105, 131) can allow the printing device (131) to execute or use the web content elements (102) and other data items directly from the memory module (110) without uploading or storing all the web content elements (102) in the printing device memory unit (132). This is done by uploading the web content interface (104, FIG. 1) from the memory module (110) and using the web content interface (104, FIG. 1) to use the web content (103, FIG. 1) directly from the memory module (110). In such an embodiment, the web content interface (104) may be uploaded to volatile or non-volatile memory in the printing device memory unit (132). If the web content interface (104) is kept only in volatile memory, the web content interface (104) may be uploaded each time the printing device (130) is powered up. This will reduce the demands on non-volatile memory.

A printing device controller or processor (133) controls the operation of the printing device (130) according to firmware stored in the printing device memory (132). The printing device controller (133) will determine what portions of the web content elements (102) to upload for storage in the memory unit (132). For example, the controller (133) will determine whether to upload the web content (103, FIG. 1) for storage in the printing device memory unit (132). Alternatively, the controller (133) may upload only the web content interface (104, FIG. 1), which will allow the embedded web server (135) of the printing device (130) to access and use the web content (103, FIG. 1) that remains stored on the memory module (110, FIG. 1).

As indicated, if the web content (103, FIG. 1) is uploaded and stored in the memory unit (132), the controller (133) can then use that web content (103, FIG. 1) as a complete web page or to add to one or more web pages stored in printing device memory (132). These web pages will then be made available for transmission over a network connection (138) by the embedded web server (135). Alternatively, the controller (133) may upload the web content interface (104, FIG. 1) to the printing device memory unit (132). The controller (133) will then use the web content interface (104, FIG. 1) to access and use the web content (103, FIG. 1) that remains stored on the memory module (110, FIG. 1).

The printing device (130) also includes a user interface (134) to allow a user or operator to control operation of the printing device (130). Such a user interface (134) may include, for example, a display device such as a liquid crystal display (LCD), a keypad, buttons or other device for allowing a user to input or select data, such as selecting menu items or responding to queries. Alternatively, the user interface (134) may include a touch screen that both displays data and receives user input.

In some embodiments, the printing device (130) may automatically upload, store or use programming or data from an interfaced memory module (110). Alternatively, the user interface (134) can allow the operator of the printing device (130) to control whether the printing device (130) uploads, stores, or uses any of the programming or data available from an interfaced memory module (110) on a consumable (120).

Once the web content elements (102) are available to the printing device (130), either stored in the printing device memory (132) or available directly from an interfaced memory module (110), the web content elements (102) may be used in conjunction with the embedded web server (135) to provide a web page indicating conditions relating to the printing device (130) or for control of the printing device (130). Such web content may be provided anytime, according to demand. For example, the user may browse to the embedded web server's main information web page and select the menu option that allows them to view the web content (103, FIG. 1) stored on the memory module (110). In some embodiments, the menu options may include "Information", "Settings", and/or "Networking." Further menu options may be added by the user, owner, operator, etc. of the printing device.

In one embodiment, the web content elements (102) may include a list of different information that may be selected from the web content (103, FIG. 1). The user may make the selection through the user interface (134) of the printing device (130) while the web content elements (102) are accessible to the controller (133). Alternatively, the user may access the web content through the web page uploaded by the embedded web server (135).

Figure 4:
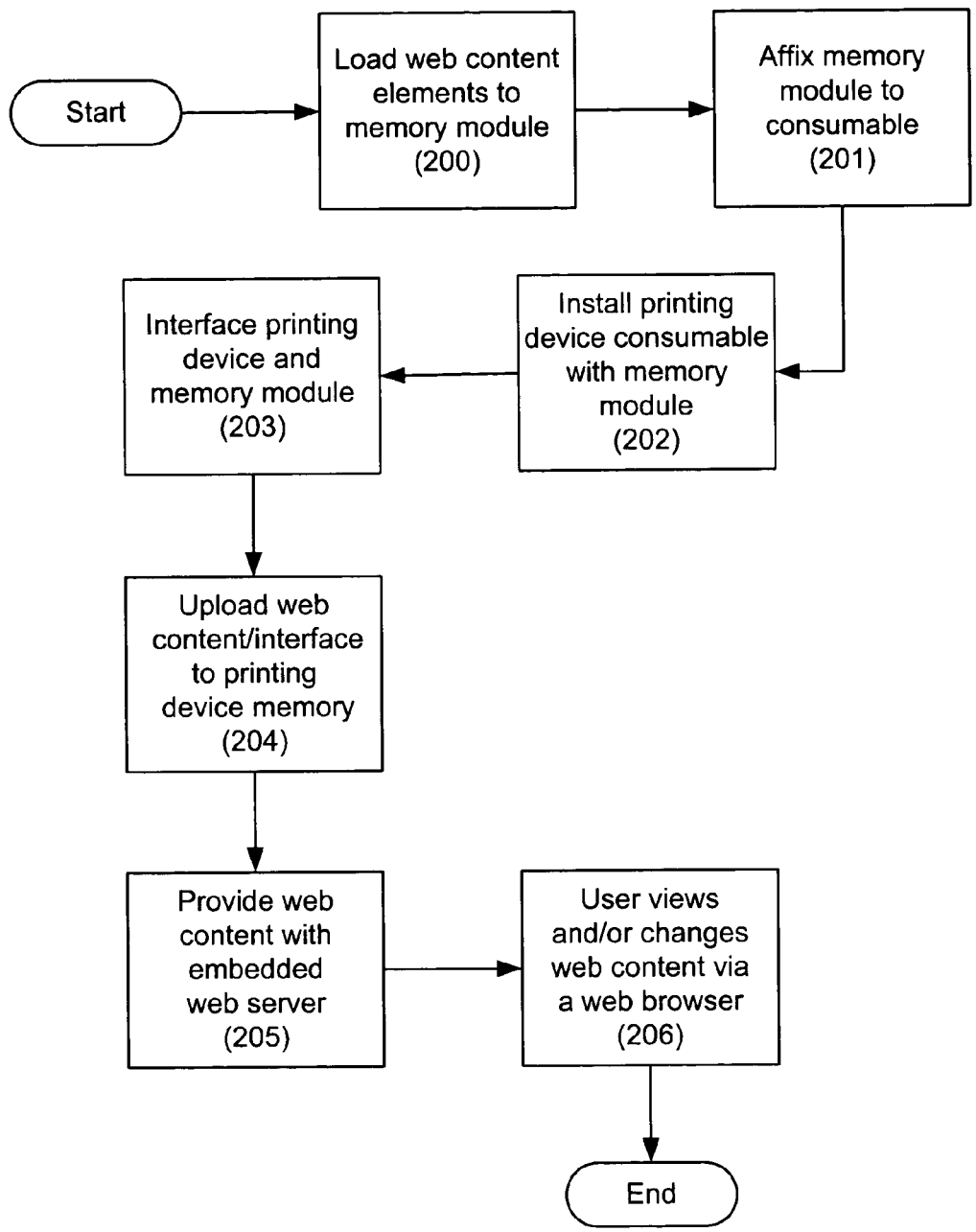
FIG. 4 is a flowchart illustrating a method of providing web content for an embedded web server according to one embodiment of the present invention.

FIG. 4 is a flowchart illustrating a method of providing web content for a printing device. As shown in FIG. 4, web content elements are loaded on a memory module (step 200). The memory module may be any memory device capable of storing computer-readable instructions, including, but not limited to, Flash memory, battery-backed random access memory (RAM), etc. The memory module is then attached or affixed to a consumable that will be used by or in a printing device (step 201).

The consumable with the attached memory device is then, when needed, installed in a printing device (step 202). As described above, the memory module and printing device are interfaced (step 203) so that the data on the memory module is made available to the printing device. The printing device then uploads data from the memory module for use by the embedded web server of the printing device (step 204). As described above, the printing device may upload and store web content or may upload an interface for accessing web content data that remains stored on the memory module (step 204).

The user may be given the option to deal selectively with each individual type of information from the web content on the memory module. The owner or operator of the printing device may specify which parts of the web content may be changed and which may not be changed. For example, the owner or operator of the printing device may place entry fields next to changeable web content and simply display the unchangeable web content. When replacing or adding web content or replacing a web content interface, a password or other confirmation of authority may be required.

After the new web content has been uploaded or the interface for the web content installed, the web content may be served as a web page or incorporated into a web page by an embedded web server (step 205). Someone needing information regarding the printing device may use a web browser to view the web page, including the web content from the consumable (step 206). In some embodiments, the web address used to access the embedded web server via a web browser may be the IP address assigned to the embedded web server on the printing device.

In some embodiments, as described above, the web page provided by the embedded web server may allow for changes to the settings or operation of the printing device (step 206). Typically, some form of authorization would be required, such as a password, before the printing device would accept and implement commands given through the web page provided by the embedded web server.

Figure 5:
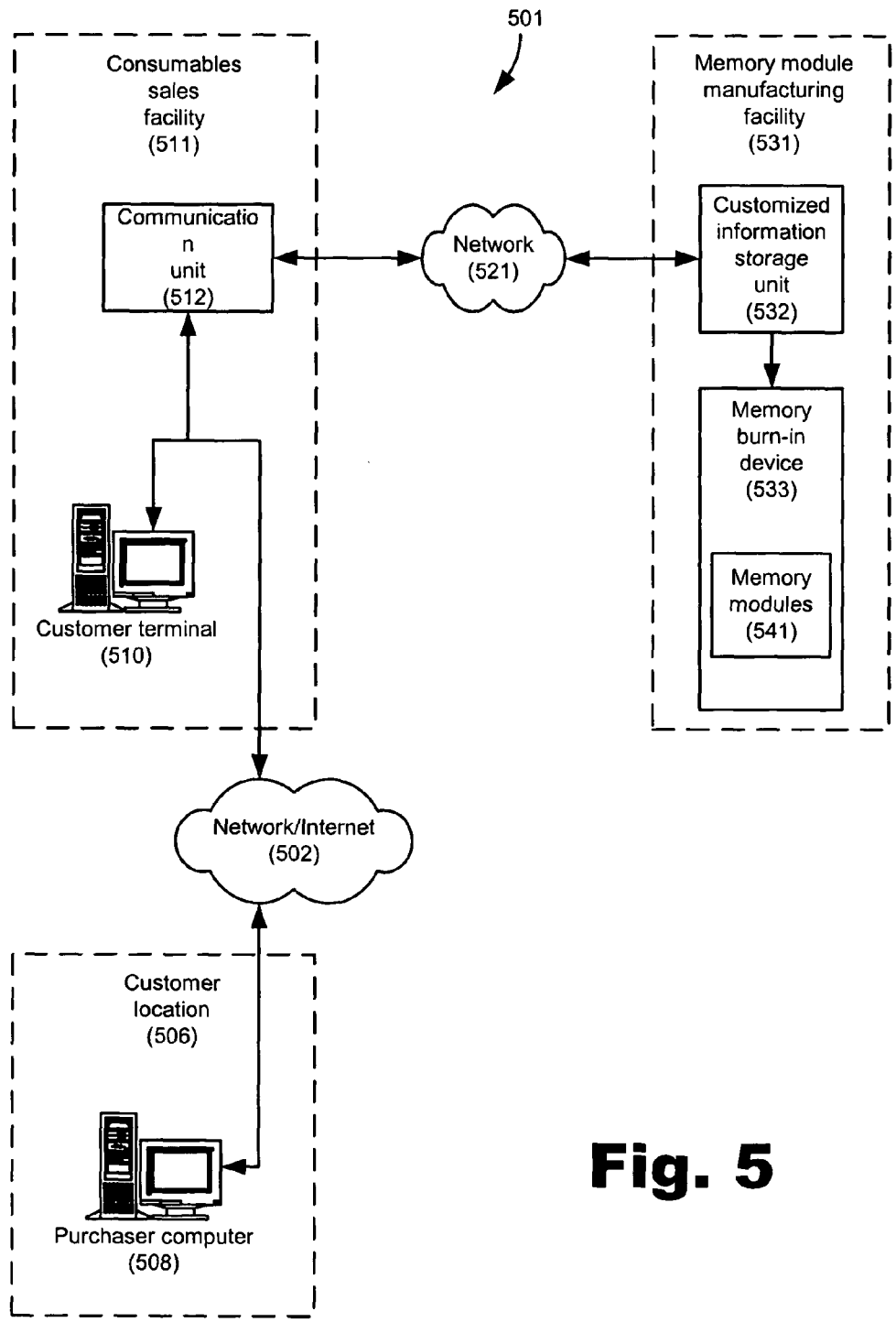
FIG. 5 is a block diagram illustrating a system for customizing web content elements on memory modules according to one embodiment of the present invention.

FIG. 5 is a block diagram illustrating a system for customizing web content elements on memory modules. As indicated above, a memory module (110) may include web content, a web content interface, and computer-readable instructions which pair the web content available on the memory module with a web page stored in the printing device memory (132, FIG. 3).

Different purchasers of a printing device consumable may want different web content to be available on web pages from their printing device or devices. Consequently, each purchaser may want specific elements of web content stored on the memory modules of purchased consumables for uploading to and use by their printing device or devices. Thus, FIG. 5 illustrates a system with which a consumable purchaser can have customized web content (103, FIG. 1) stored on a memory module (110, FIG. 2) that is affixed to the consumable (120, FIG. 2) being purchased. The system of FIG. 5 can also allow for the other web content elements (102, FIG. 1) on the memory module to be customized or a version of the web content interface (104, FIG. 1) to be selected so as to be compatible with the printing device of the purchaser.

As shown in FIG. 5, the system (501) may include components at up to three different locations: a customer location (506), a consumables sales facility (511) and a memory module manufacturing facility (531). There are a number of possible scenarios for a purchaser who wishes to buy printing device consumables with customized memory modules bearing web content.

For example, the purchaser may visit a sales facility (511). The sales facility (511) may include a customer terminal (510) into which the purchaser can enter the information to customize a memory module on a purchased consumable. For example, the purchaser, using the customer terminal (510), can enter or select from available options the web content (103, FIG. 1) to be stored on a customized memory module and eventually uploaded to an embedded web server. Alternatively, the purchaser could telephone, fax, email or otherwise transmit the information to the sales facility (511), whereupon sales facility personnel would enter the information into the terminal (510).

The information is then sent to a communication unit (512). The communication unit (512) transfers the information for customizing the memory module to a memory module manufacturing facility (531). The communication unit (512) may communicate with the manufacturing facility (531) through a network (521). The network (521) may be a private or public network, and may include the Internet. The sales facility (511) and the manufacturing facility (531) may be at the same location or may be in different cities or even on different continents.

The information for customizing the memory module is stored in a data storage unit (532) until it is time to prepare the customized memory module. The information is then read into the system that forms the customized memory module, for example, a memory burn-in device (533). The burn-in device (533) then creates the customized memory module (541) desired by the purchaser by loading the desired data onto the memory module (541). The customized memory module (541) is then affixed to the ordered consumable and shipped to the purchaser.

In a different scenario, the purchaser need not visit the sales facility (511) to place an order for a customized memory module on a consumable. Rather, the purchaser may use a computer (508) at the customer's location (506). For example, the purchaser, using the computer (508) can contact the communication unit (512) electronically. In one embodiment, the communication unit (512) includes a web server that the purchaser accesses through the Internet (502). The purchaser then inputs the information for customizing the memory module. This information is then transmitted to the communication unit (512), which may treat the information in the same manner as if entered through the customer terminal (510) at the sales facility (511). The information is then loaded to a customized memory module (541) as described above.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A method comprising:
receiving, in a printing device, a printing device consumable that is storing web content on a memory module attached to the printing device consumable;
uploading said web content from said memory module on said printing device consumable to a memory in said printing device when said consumable is installed in said printing device; and
with said printing device, receiving a request via a network to which said printing device is connected for a web page about said printing device to be transmitted via said network to a client issuing said request;
in response to said request, transmitting said web page to said client using an embedded web server that is embedded in said printing device, said web page comprising said web content provided to said printing device with said memory module attached to said printing device consumable;
receiving data specifying desired web content from a purchaser of a printing device consumable; and
storing said purchaser-specified web content on said memory module attached to said printing device consumable.

2. The method of claim 1, further comprising providing said printing device consumable with said memory module to said purchaser.

3. The method of claim 1, wherein said receiving data specifying said web content from a purchaser comprises receiving said web content through a terminal at a consumables sales facility.

4. The method of claim 1, wherein said receiving data specifying said web content from a purchaser comprises receiving said web content from said purchaser through a computer network.

5. The method of claim 4, wherein said computer network comprises the Internet.

6. A consumable for use with a printing device, said consumable comprising:
a printing device consumable;

a memory module attached to said printing device consumable;

web content stored on said memory module, wherein said web content relates to said printing device and is designated for inclusion in a web page that is output by said printing device using a web server embedded in said printing device in response to a request received via a network, to which said printing device is connected, for a web page about said printing device; and a web content interface stored on said memory module which, when uploaded to a printing device, allows access and use of said web content on said memory module.

7. The consumable of claim 6, further comprising a wireless interface for said memory module for interfacing and communicating with a printing device.

8. The consumable of claim 7, wherein said wireless interface comprises a radio frequency interface.

9. The consumable of claim 7, wherein said wireless interface comprises an infrared interface.

10. The consumable of claim 6, further comprising a wired interface for said memory module for interfacing and communicating with a printing device.

* * * * *